Nov. 5, 1963 S. B. MARKS 3,109,238
PORTABLE DENTAL DRILL
Filed Nov. 28, 1961
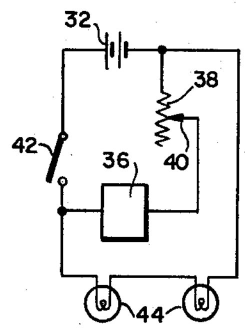
FIG. 5.
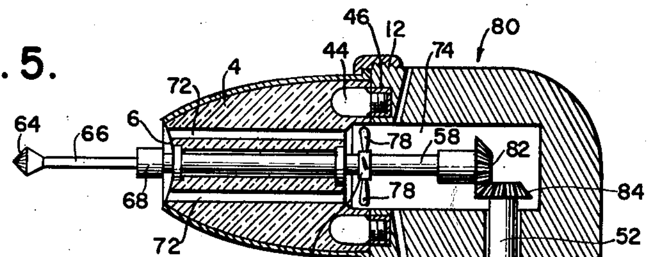
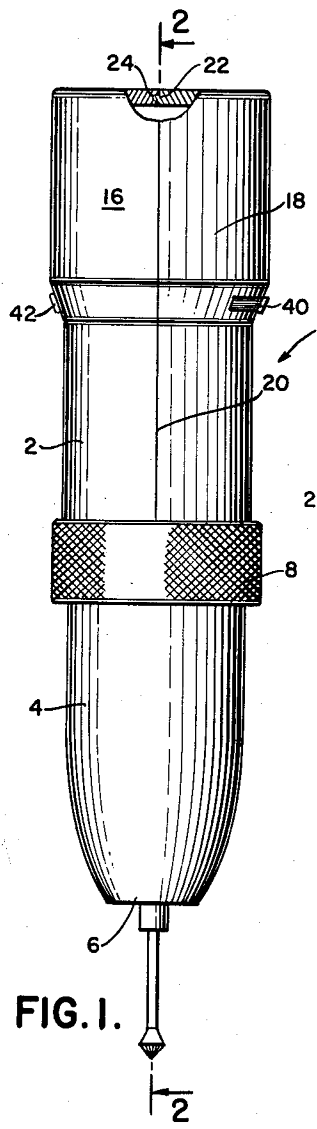
FIG. 1.
FIG. 2.
FIG. 4.
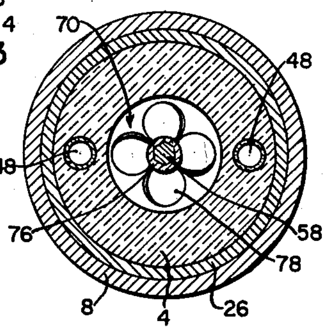
FIG. 3.
INVENTOR
Samuel B. Marks
BY Clive H. Bramson
ATTORNEY United States Patent Office 3,109,238

Patented Nov. 5, 1963

3,109,238

PORTABLE DENTAL DRILL

Samuel B. Marks, 140 S. Middle Neck Road, Great Neck, N.Y.

Filed Nov. 28, 1961, Ser. No. 155,320
11 Claims. (Cl. 32—27)

This invention relates in general to power-driven rotary dental tools and more particularly to a portable dental tool having a self-contained power source, said power source being effectively utilized to provide both cooling and illumination while performing work on a patient's tooth, in addition to driving the drill tool.

The prior art is replete with teachings of power-driven dental tools wherein the motivating force, whether it be electricity, water or air, must be adapted to the tool from without, thus necessitating some form of cable or conduit connecting the tool with a convenient power source near the place of work. Accordingly, in the absence of an adaptable source of power, as for example, in the field or during a period of power failure, the dental surgeon would be bereft of the use of his most valuable instrument, the dental drill. It will be further appreciated that notwithstanding the proximity and availability of the power supply with respect to the intended place of use, the mere existence of the cable or conduit has always constituted a hindrance adversely effecting the most efficient use of the dental drill.

Whereas air or water for cooling purposes and illumination is required during the drilling operation, the availability thereof, either singly or in combination, often presents a problem. Again, as in the case of the power source, inconveniences occasioned by extensive conduits and external light sources are nuisances prevalent to the dental surgeon.

Essentially the present invention is directed to providing a portable dental drill which is independent of any external power source and which may be utilized as a conventional dental drill at any place lacking of suitable motivating power.

Consonant with the foregoing, the instant invention has for an object the provision of an electric dental drill which may be more easily manipulated because of the absence of any connecting cables, pulleys, or conduits.

Another object of the present invention is to provide a high speed, high torque battery operated dental drill, compact, slender and balanced for convenience of handling by virtue of the novel arrangement of parts.

A further object of the present invention is the provision of an improved dental drill having means internally of the casing thereof, whereby a forced flow of air may be generated thereby and directed to the tooth being operated on.

A still further object of the instant invention is the provision of a new and useful dental drill adapted to emit illuminating rays of light directly upon the region of the patient's mouth wherein work is being performed.

Still another object of the present invention is to provide a portable dental drill having control means conveniently positioned surfacedly of the casing thereof whereby actuation and speed of the drill may be manually manipulated by the hand supporting the device.

It is a still further object of this invention to provide a rotary dental tool accomplishing the objectives noted above, which tool is of extremely simple construction, economical of manufacture, and highly reliable in operation.

Further and additional objects and advantages will become apparent to those skilled in the art as the description proceeds with reference to the accompanying drawings, wherein:

FIG. 1 is a vertical side view of the tool apparatus embodying the present invention, the casing thereof being partially broken away;

FIG. 2 is a longitudinal sectional view taken along line 2—2 of FIG. 1;

FIG. 3 is a transverse sectional view taken along line 3—3 of FIG. 2;

FIG. 4 is a vertical side view of the tool apparatus illustrating a modification thereof, a portion being shown in cross section; and FIG. 5 is a diagrammatic illustration of the circuitry employed in the present invention.

A general understanding of the arrangement and location of the parts of the novel apparatus may be had by reference to FIGURES 1 and 2 of the drawings wherein the portable dental drill in general is indicated by the numeral 1 and includes an elongated casing having a rearward section 2 and a forward section 4, said forward section having a concave forward end 6. Annular coupling 8, shown knurled in FIGURE 1 is comprised at one edge of inwardly facing flange 10 and of inwardly facing threaded portion 12 which extends substantially one half the width of the said coupling and which terminates endwise thereof at edge 14.

As illustrated, rearward section 2 is formed of separable substantially half portions 16, 18, positioned in edge abutting relation as shown at 20. With reference to the broken away section of said FIGURE 1, it will be observed that tongue 22 is adapted for reception within groove 24 thus providing partial retention of said portion 16 within said portion 18. It will be appreciated that positive connection of the said half portions is accomplished through engagement of the said tongue and groove as aforestated, by positioning said annular coupling 8 over annular shoulder 26 of the forward section and thereafter by threadedly securing the said coupling to annular thread 28 provided on the said rearward section. Access to the interior of the said rearward section is readily afforded by reversing the assembling procedure.

Battery housing 30 located as shown in FIGURE 2 of the drawings is adapted to receive two dry cell batteries 32 as shown, to thereby provide a direct current source to a high speed high torque electric motor 36. It will be understood that the batteries which are mounted in the drill casing may be exchanged when depleted or may be permanently mounted in the casing if the latter is also provided with suitable contacts to permit the batteries to be connected to a charger or a charger may also be mounted within the casing in order that the entire apparatus may be plugged into an electric outlet.

Positioned intermediate of the said power source and the said electric motor is variable resistor or rheostat 38, slidable contactor 40 being surfacedly positioned within the said casing and manually regulated therefrom to control the current furnished motor 36 and to thus regulate the speed thereof. Switch 42, also operable from without the said casing functions to either open or close the circuit illustrated in FIGURE 5 of the drawings and is employed in the preferred embodiments of the invention disclosed in the drawings and described herein. It will be further observed that rheostat 38, interposed between said electric motor 36 and said batteries 32, is solely instrumental with respect to controlling the speed of the motor, electric illuminating bulbs 44, to be described hereinbelow, being unaffected thereby but controlled only by the said switch 42.

Said electric bulbs 44, received at their base portions within contactor sockets 46 located within said rearward section 2, extend complementarily into cavities 48 provided therefor and shown positioned diametrically opposed within said forward section 4. Said forward section being formed of material characterized by high internal reflection properties, e.g., polymethyl methacrylate, manifests this property by effectively channelling the illumination emitted by said electric bulbs internally of the said forward section, thus directing the said illumination to the region of the patient's mouth whereat work is being performed. That is, notwithstanding the length or slenderness of the said forward section, minimization of undesirable dispersion and/or emission of light rays at any region other than the said concave end 6 is effectuated, thereby occasioning a concentration of light as desired. A metallic or non-metallic opaque reflective coating 50 as shown in the drawings may be utilized either in lieu of the aforesaid material exhibiting a high internal reflectivity index, or in addition thereto should it be desirably to positively avoid light dispersion through the side walls of the said forward section.

Drive shaft 52, drivingly connected to the said electric motor 36 and disposed for rotation within bearing sleeve 54 axially of said rearward section, is terminally provided with internal socket 56. Extension adapter 58, received at one end within said socket 56 for driving engagement with said drive shaft 52 is disposed for rotation within bearing sleeve 60 axially of the said forward section. As seen in the drawings, the other end of the extension adapter projects outwardly and centrally of the concave end 6 of the said forward section 4. Threaded tool holding stud 62 located endwise of the said extension adapter is provided to receive a drilling tool 64 which has a shank 66 and a threaded socket 68, the latter being removably engageable with the tool holding stud 62.

It will be understood that other tools, for drilling or other purposes, either of metal or bonded abrasive materials, may be used in place of the drilling tool 64 which is shown.

To the end of providing a continuous low pressure, high velocity flow of cooling air to the vicinity of the said drilling tool 64, air blowing means 70 drivingly connected to motor 36, forcefully conveys such flow through circularly oriented longitudinal passages 72 which communicate cylindrical bore cavity 74 and the region externally adjacent said concave end 6 thus transporting volumes of air educted through air-breathing passages 75 in current form to the region of the dental drill tool. The said air blowing means 70, comprised of central hub member 76 and pitched vanes 78 disposed radially thereabout, is axially united with the said extension adapter for rotation therewith within the said cylindrical bore cavity.

While the foregoing description was essentially directed to the structural embodiment illustrated in FIGURES 1–3 of the drawings, it will be understood that the construction which may be utilized in carrying out the invention is, of course subject to modification without departing from the spirit and scope thereof. FIGURE 4 of the drawings represents one example of the various modifications contemplated and falling within the purview of the invention. As disclosed therein the portable dental drill designated generally by numeral 80 is comprised of an angular rearward section 2; extension adapter 58 and drive shaft 52 being drivingly engaged through bevel gears 82, 84 respectively.

Insofar, therefore, as the basic mode of operation is retained, it will be appreciated that changes in form necessary or desirable to accommodate the purpose of the user may be made without departing from the spirit and scope of the invention as defined in the appended claims.

What is claimed is:

1. A portable dental drill comprised of an elongated casing having a rearward and a forward section, said forward section having a concave forward end, a coupling adapted to removably connect said sections in axially elongated relation, a battery housed within said rearward section, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft extending from said motor and projecting into and axially of said forward section, socket means disposed terminally of the said drive shaft, an extension adapter axially disposed for rotation within the said forward section, one end of said extension adapter being removably secured within said socket means, the other end thereof extending outwardly of said forward section and adapted to receive a drill tool thereat, a cylindrical bore within said forward section, a plurality of passages disposed longitudinally of the said forward section and extending through said concave forward end, and air blowing means residing within said bore and in driving engagement with said electric motor.

2. A portable dental drill comprised of an elongated casing having a rearward and a forward section, said rearward section being formed of longitudinally separable substantially half shell portions, an annular coupling adapted to removably connect said sections in axially elongated relation, a battery housing within said rearward section and at least one battery received therein, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft extending from said motor and projecting into and axially of said forward section, socket means disposed terminally of said drive shaft, an extension adapter axially disposed for rotation within the said forward section, one end of said extension adapter being removably secured within said socket means, the other end thereof extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air blowing means residing within said bore and in driving engagement with said electric motor.

3. A portable dental drill comprised of an elongated casing having a rearward and a forward section, said rearward section being formed of longitudinally separable substantially half shell portions, said forward section being formed of material having high internal reflection characteristics, an annular coupling adapted to removably connect said sections in axially elongated relation, a battery housing within said rearward section and at least one battery received therein, an electric motor wholly mounted within said rearward section, a drive shaft extending from said motor and projecting into and axially of said forward section, socket means disposed terminally of said drive shaft, an extension adapter axially disposed for rotation within the said forward section, one end of said extension adapter being removably secured within said socket means, the other end thereof extending outwardly of said forward section and adapted to receive a drill tool thereat, a bore cavity within said casing, said bore cavity being disposed concentrically with respect to a portion of said extension adapter, a plurality of passages extending longitudinally of said forward section providing communication between said bore cavity and the region of said drill tool, air blowing means residing within said bore and in driving engagement with said electric motor, at least one electric illumination member disposed within said casing, said member being energized by said at least one battery and arranged to illuminate the region of the drill tool.

4. A portable dental drill comprised of an elongated casing having a rearward and a forward section, said rearward section being formed of longitudinally separable substantially half shell portions, said forward section being formed of material having a high internal reflection index, an annular coupling adapted to removably connect said sections in axially elongated relation, a battery housing within said rearward section and at least one battery received therein, an electric motor wholly mounted within said rearward section, a drive shaft extending from said motor and projecting into and axially of said forward section, socket means disposed terminally of said drive shaft, an extension adapter axially disposed for rotation within the said forward section, one end of the said extension adapter being removably secured within said socket means, the other end thereof extending outwardly of said forward section and adapted to receive a drill tool thereat, at least one electric bulb socket disposed within said casing, an electric bulb received within said bulb socket, said at least one electric bulb being energized by said at least one battery, the illumination emitted thereby being directed internally of said forward section to the region of the said drill tool.

5. A portable dental drill comprised of a casing having a rearward and a forward section, an annular coupling adapted to removably connect said sections, a battery housing within said rearward section and at least one battery received therein, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft drivingly connected to said electric motor, an extension adapter axially disposed for rotation within the said forward section, one end of said extension adapter being drivingly engaged with said drive shaft, the other end of said extension adapter extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air blowing means residing within said bore and in driving engagement with said electric motor.

6. A portable dental drill comprised of a casing having a rearward and a forward section, said rearward section being formed of separable substantially half shell portions, an annular coupling adapted to removably connect said sections, a battery housing within said rearward section and at least one battery received therein, an electric motor wholly mounted within said rearward section, a drive shaft drivingly connected to said electric motor, an extension adapter axially disposed for rotation within the said forward section, one end of said extension adapter being in driving engagement with said drive shaft, the other end of said extension adapter extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air blowing means residing within said bore and in driving engagement with said electric motor.

7. A portable dental drill comprised of a casing having a rearward and a forward section, said rearward section being formed of separable substantially half shell portions, said forward end being angularly connected to said rearward section, an annular coupling adapted to removably connect said sections, a battery housing within said rearward section and at least one battery received therein, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft drivingly connected to said electric motor, an extension adapter axially disposed for rotation within the said forward section, one end of said extension adapter being drivingly engaged with said drive shaft, the other end of said extension adapter extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air blowing means residing within said bore and in driving engagement with said electric motor.

8. A portable dental drill comprised of a casing having a rearward and a forward section, said rearward section being formed of separable substantially half shell portions, said forward section being formed of material characterized by a high internal reflection index, said forward section being angularly connected to said rearward section, an annular coupling adapted to removably connect said sections, a battery housing within said rearward section and at least one battery received therein, an electric motor wholly mounted within said rearward section, a drive shaft drivingly connected to said electric motor, an extension adapter axially disposed for rotation within said forward section, one end of said extension adapter being drivingly engaged with said drive shaft, the other end of said extension adapter extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air blowing means residing within said bore and in driving engagement with said electric motor, at least one electric bulb socket disposed within said casing, an electric bulb received within said bulb socket, said at least one electric bulb being energized by said at least one battery, the illumination emitted thereby being directed internally of said forward section to the region of the said drill tool.

9. A portable dental drill comprised of a casing having a rearward and a forward section, means for removably connecting said sections, a battery housing within said rearward section and at least one battery received therein, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft drivingly connected to said electric motor, an extension adapter axially disposed for rotating within said forward section, one end of said extension adapter being in driving engagement with said drive shaft, the other end of said extension adapter extending outwardly of said forward section and adapted to receive a drill tool thereat, a bore cavity within said casing concentrically disposed with respect to a portion of said extension adapter, a plurality of passages extending longitudinally of said forward section providing communication between said bore cavity and the region of said drill tool, air breathing passages extending from said bore through said casing, air blowing means residing within said bore and in driving engagement with said electric motor.

10. A portable dental drill according to claim 1 wherein said air blowing means is comprised of a central hub member and a plurality of pitched vanes radially disposed thereabout.

11. A portable dental drill comprised of a casing having a rearward and a forward section, said rearward section being formed of separate portions, coupling means adapted to removably connect said sections, a battery housing within said rearward section and at least one battery received therein, an electric motor wholly mounted within said rearward section, a rheostat for controlling the speed of said electric motor and a slidable contactor cooperatively related therewith, said slidable contactor being surfacedly positioned within said casing and manually regulated therefrom, a drive shaft drivingly connected to said electric motor, an extension adapter axially disposed for rotation within the said forward section, one end of said extension adapter being in driving engagement with said drive shaft, the other end of said extension adapter extending outwardly of said forward section and adapted to receive a drill tool thereat.

References Cited in the file of this patent

UNITED STATES PATENTS

| | | |
|---|---|---|
| 2,829,285 | Steiner et al. | Apr. 1, 1958 |
| 2,876,369 | Doerner | Mar. 3, 1959 |
| 3,019,673 | Sjostrand et al. | Feb. 6, 1962 |